March 28, 1950  A. F. REILLY  2,501,917
LOCKET
Filed Aug. 31, 1945
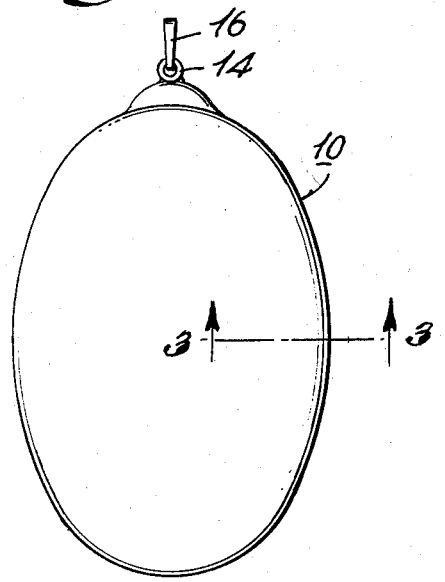
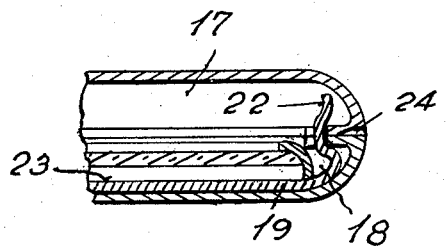
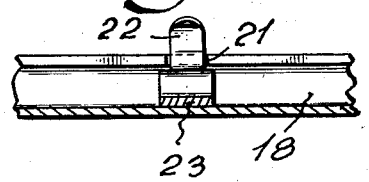
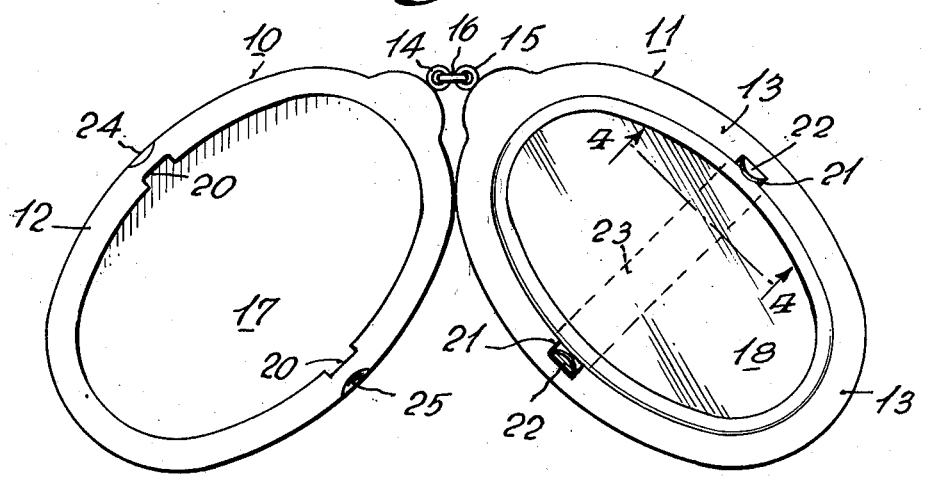
Inventor
Alfred F. Reilly,
By Karl Irnwig
his Attorney Patented Mar. 28, 1950

2,501,917

UNITED STATES PATENT OFFICE 2,501,917

LOCKET

Alfred F. Reilly, North Attleboro, Mass.

Application August 31, 1945, Serial No. 613,732

3 Claims. (Cl. 63—18)

The invention relates to lockets which may enclose pictures, mementos or the like and which may be carried or worn on the person as by a necklace or pin, etc. It is a purpose of the invention to provide such a locket with a substantially unbroken outer contour and no operating or constructive members projecting so as to mar the beauty or integrity of appearance. The locket is made of two facing members enclosing the mementos or the like but without hinges. The two members have substantially smooth engaging surfaces and the seam of engagement may be substantially inconspicuous. Since there is no hinge between the members, they may be opened at almost any point in their contour and to aid in this relatively small inconspicuous nicks may be made at suitable points as, for instance, at opposite sides thereof. The members may be held together by internal locking means carried adjacent the engaging surfaces which may preferably be resilient so that manipulation, especially at the nicks, may force the members apart to open the locket for inspection or adjustment of its contents.

Since there is no hinge holding the members together, they may each be provided with holes or openings at corresponding points so as to register and afford means for mounting the locket on a necklace or the like in such a way that even if the members come apart or are separated both will be held and kept from loss.

For convenience and to cause the locket to hang properly and conveniently to be an interesting ornament, the holes may be in registering projections from the members.

The embodiment of the invention is illustrated in the accompanying drawings in which Figure 1 is a front elevation of a closed locket. Figure 2 is a plan of the locket open showing the inner of facing surfaces of the two members. Figure 3 is a section on the line 3—3 of Figure 1. Figure 4 is a section on the line 4—4 of Figure 2. There is shown a plain locket but it will be understood that the outer surface of one or both members may be smooth, plain or ornamented as desired and the shape of the locket may be as desired and is not limited to the oval form illustrated.

The locket consists of two members 10 and 11 which preferably will be of the same shape and will have smooth surfaces 12, 13 about their edges which meet and form an even closure.

For supporting the locket registering eyelets or holes 14, 15 may be provided in both members through which may be passed any suitable member here illustrated as a ring or the like 16 which as shown in Figure 2 when the locket is open may hold the members 14, 15 together and prevent separation or loss of either member. Members are provided within the smooth surfaces 12, 13 recesses 17, 18 for the receipt and preservation of mementos. In one or both recesses may be provided the usual frictionally held frame such as shown at 19 in the recess 18. This may carry and hold in place a sheet of glass or plastic, etc., as is well known in the art.

In the inner edge of the smooth surface 12 is shown notches or recesses 20. At registering points on the inner edge of the smooth surface 13 may be provided similar notches or recesses 21 through which project catches 22 which engage in the recesses 20 and normally hold together the two members 10 and 11 thus closing the locket. The catches 22 are the ends of a cross strap 23 resting across the inner surface of the base of the member 11 and then rising under the overhanging edge under the smooth surface 13 where it is slightly narrowed so as to form a shoulder to hold the strap in place. The catches are made of springy or resilient material so that while they have a strong grip on the seats 20 they may be forced into or away therefrom by pressure on the separate members 10 and 11. In order to facilitate opening there are provided two nicks 24, 25 on the outer edge of one of the members 10, 11 adjacent the engaging catches 22 and their seats 20 so that insertion of a pressure device in either or both notches 24, 25 will force open the locket for access to its interior. The notches 24, 25 are made small and inconspicuous so as not to mar or interfere with the attractive appearance of the locket when closed.

I claim as my invention:

1. A locket comprising two separable members of substantially the same shape and adapted to lie in contact with each other, resilient catches within the borders of one member, seats within the borders of the other member constructed and arranged to engage the catches by snap action and hold the members together, notches at opposite sides of the locket to open it, and holes in the members in register with each other by which the locket may be suspended.

2. A locket comprising two separable members, smooth surfaces on each member adapted to lie in close contact with each other, resilient catches in one member inward of its periphery and projecting from its smooth surface, seats in the other member inward of its periphery recessed in its smooth surface and positioned, constructed and arranged to engage the catches by snap action and hold the smooth surfaces in contact with each other, and similarly disposed projections on each member having registering holes therein by which the locket may be suspended.

3. In a locket, two hollow members each open at one side and provided with registering holes to support the locket, a substantially smooth inwardly extending peripheral plate in each member at its open side and in contact with each other, registering openings in the inner edges of both plates, a band extending across the bottom of one member, resilient reduced end pieces at both ends of the band projecting through the openings in the plate in the last-mentioned member and engaging the openings in the plate in the other member, shoulders on the band adjacent its ends and underlying and engaging the plate in the member carrying the band, and inconspicuous opening nicks in the outer edge of the plate in one member adjacent the openings.

ALFRED F. REILLY.

REFERENCES CITED

The following references are of record in the file of this patent:

UNITED STATES PATENTS

| Number | Name | Date |
| --- | --- | --- |
| 718,562 | Blackinton | Jan. 13, 1903 |

FOREIGN PATENTS

| Number | Country | Date |
| --- | --- | --- |
| 1,264 | Great Britain | July 20, 1905 |